United States Patent
Agarwal et al.

(10) Patent No.: US 11,544,452 B2
(45) Date of Patent: *Jan. 3, 2023

(54) GENERATING TEMPLATES FOR AUTOMATED USER INTERFACE COMPONENTS AND VALIDATION RULES BASED ON CONTEXT

(71) Applicant: Airbnb, Inc., San Francisco, CA (US)

(72) Inventors: Shivali Agarwal, Ghaziabad (IN);
Maja Vukovic, New York, NY (US);
Frederick Y. Wu, Greenwich, CT (US)

(73) Assignee: Airbnb, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/700,125

(22) Filed: Dec. 2, 2019

(65) Prior Publication Data
US 2020/0104355 A1    Apr. 2, 2020

Related U.S. Application Data

(63) Continuation of application No. 15/233,497, filed on Aug. 10, 2016, now Pat. No. 10,521,502.

(51) Int. Cl.
*G06F 8/38*    (2018.01)
*G06F 40/186*    (2020.01)
(Continued)

(52) U.S. Cl.
CPC .......... *G06F 40/186* (2020.01); *G06F 3/0482* (2013.01); *G06F 8/38* (2013.01);
(Continued)

(58) Field of Classification Search
None
See application file for complete search history.

(56) References Cited

U.S. PATENT DOCUMENTS 6,108,004 A    8/2000 Medl
7,243,334 B1    7/2007 Berger et al.
(Continued)

FOREIGN PATENT DOCUMENTS

WO    WO2033541 A2    4/2002

OTHER PUBLICATIONS

Yang et al., "Effective Multi-Label Active Learning for Text Classification," 15th ACM SIGKDD Conference on Knowledge Discovery and Data Mining, Jun. 2009, 9 pages.
(Continued)

*Primary Examiner* — Adam M Queler
*Assistant Examiner* — Maria S Ayad
(74) *Attorney, Agent, or Firm* — Schwegman Lundberg & Woessner, P.A.

(57) ABSTRACT

Generating a user interface template is provided. A user context corresponding to an action request by a user to perform a task on a computer is determined. A set of user interface templates corresponding to the action request by the user and the user context is retrieved. Components of different user interface templates within the set of user interface templates are compared. Relevant components of the different user interface templates are combined based on the action request by the user and the user context. The user interface template corresponding to the action request by the user and the user context is generated based on the combined relevant components of the different user interface templates.

18 Claims, 10 Drawing Sheets

(51) Int. Cl.
  *G06F 3/0482* (2013.01)
  *G06F 40/55* (2020.01)
  *G06F 9/451* (2018.01)
  *H04N 1/00* (2006.01)
  *G06F 9/445* (2018.01)

(52) U.S. Cl.
  CPC .............. *G06F 9/451* (2018.02); *G06F 40/55* (2020.01); *H04N 1/00501* (2013.01); *G06F 9/4451* (2013.01); *H04N 1/00509* (2013.01)

(56) References Cited

U.S. PATENT DOCUMENTS

| | | | | |
|---|---|---|---|---|
| 7,567,861 | B2* | 7/2009 | Inagaki | G01C 21/3679 |
| | | | | 701/1 |
| 7,930,676 | B1* | 4/2011 | Thomas | G06F 9/44505 |
| | | | | 706/45 |
| 7,941,438 | B2 | 5/2011 | Molina-Moreno et al. | |
| 8,621,416 | B1* | 12/2013 | Thomas | G06F 9/44505 |
| | | | | 706/45 |
| 8,683,348 | B1* | 3/2014 | Blank | G06F 3/038 |
| | | | | 715/709 |
| 9,348,479 | B2* | 5/2016 | Liu | G06F 3/0481 |
| 9,785,534 | B1* | 10/2017 | Paulus | G06F 3/048 |
| 10,187,254 | B2* | 1/2019 | Li | G06Q 30/02 |
| 10,223,134 | B1* | 3/2019 | Penilla | G06F 3/04845 |
| 10,338,894 | B2 | 7/2019 | Sarferaz | |
| 10,387,173 | B1* | 8/2019 | Paulus | G06Q 10/0635 |
| 10,409,387 | B2* | 9/2019 | Bai | G06F 16/436 |
| 10,521,502 | B2 | 12/2019 | Agarwal et al. | |
| 10,772,551 | B2* | 9/2020 | DeLuca | A61B 5/165 |
| 2002/0063734 | A1 | 5/2002 | Khalfay et al. | |
| 2002/0118225 | A1 | 8/2002 | Miksovsky | |
| 2002/0133545 | A1 | 9/2002 | Fano et al. | |
| 2002/0163535 | A1 | 11/2002 | Mitchell et al. | |
| 2003/0025732 | A1 | 2/2003 | Prichard | |
| 2003/0046401 | A1 | 3/2003 | Abbott et al. | |
| 2003/0145305 | A1 | 7/2003 | Ruggier | |
| 2004/0153992 | A1 | 8/2004 | Molina-Moreno et al. | |
| 2004/0210445 | A1 | 10/2004 | Veronese et al. | |
| 2005/0055633 | A1* | 3/2005 | Ali | G06F 8/38 |
| | | | | 715/236 |
| 2005/0071853 | A1* | 3/2005 | Jones | G06F 8/38 |
| | | | | 719/328 |
| 2005/0198589 | A1* | 9/2005 | Heikes | H04L 51/04 |
| | | | | 715/802 |
| 2005/0246686 | A1* | 11/2005 | Seshadri | G06N 5/046 |
| | | | | 717/117 |
| 2005/0251788 | A1* | 11/2005 | Henke | G06F 8/38 |
| | | | | 717/109 |
| 2006/0015478 | A1 | 1/2006 | Beringer et al. | |
| 2006/0015479 | A1 | 1/2006 | Wood et al. | |
| 2006/0031849 | A1* | 2/2006 | Barta | G06F 9/4843 |
| | | | | 719/320 |
| 2006/0165123 | A1 | 7/2006 | Jerrard-Dunne et al. | |
| 2006/0256094 | A1* | 11/2006 | Inagaki | G01C 21/3611 |
| | | | | 345/173 |
| 2007/0067341 | A1 | 3/2007 | Chen et al. | |
| 2007/0168933 | A1* | 7/2007 | Berger | G06F 8/38 |
| | | | | 717/106 |
| 2007/0240041 | A1 | 10/2007 | Pearson | |
| 2008/0148157 | A1* | 6/2008 | Kamdar | G06F 9/4451 |
| | | | | 715/747 |
| 2008/0243367 | A1* | 10/2008 | Wako | G01C 21/367 |
| | | | | 701/432 |
| 2008/0275910 | A1 | 11/2008 | Molina-Moreno et al. | |
| 2008/0307047 | A1 | 12/2008 | Jowett et al. | |
| 2009/0125546 | A1 | 5/2009 | Iborra et al. | |
| 2009/0132995 | A1 | 5/2009 | Iborra et al. | |
| 2009/0157576 | A1* | 6/2009 | Slaney | G06F 16/9577 |
| | | | | 706/16 |
| 2010/0162143 | A1* | 6/2010 | Abou | G06Q 10/06 |
| | | | | 715/762 |
| 2010/0262902 | A1 | 10/2010 | Burns | |
| 2011/0022974 | A1 | 1/2011 | Kinoshita et al. | |
| 2011/0035688 | A1 | 2/2011 | Kinoshita et al. | |
| 2011/0035706 | A1 | 2/2011 | Kinoshita et al. | |
| 2011/0078103 | A1 | 3/2011 | Teng et al. | |
| 2011/0099499 | A1 | 4/2011 | Pnueli et al. | |
| 2011/0161941 | A1 | 6/2011 | Thomson et al. | |
| 2011/0258534 | A1 | 10/2011 | Young | |
| 2012/0066620 | A1 | 3/2012 | Teng et al. | |
| 2012/0311467 | A1 | 12/2012 | Bijani et al. | |
| 2013/0063484 | A1 | 3/2013 | Gehani et al. | |
| 2013/0086597 | A1 | 4/2013 | Cornrwall et al. | |
| 2013/0263280 | A1 | 10/2013 | Cote | |
| 2013/0275580 | A1* | 10/2013 | Chamiel | G06Q 30/0242 |
| | | | | 709/224 |
| 2013/0275899 | A1* | 10/2013 | Schubert | B60K 35/00 |
| | | | | 715/765 |
| 2013/0326376 | A1 | 12/2013 | Stachniak et al. | |
| 2014/0053063 | A1 | 2/2014 | Cirrincione et al. | |
| 2014/0114899 | A1* | 4/2014 | Wan | G06N 5/04 |
| | | | | 706/46 |
| 2014/0122289 | A1 | 5/2014 | Beck | |
| 2014/0208243 | A1 | 7/2014 | Werner | |
| 2014/0229826 | A1 | 8/2014 | Castro et al. | |
| 2014/0245196 | A1 | 8/2014 | Zheng et al. | |
| 2014/0282125 | A1* | 9/2014 | Duneau | G06F 8/38 |
| | | | | 715/762 |
| 2014/0370479 | A1* | 12/2014 | Gazzaley | G09B 5/02 |
| | | | | 434/322 |
| 2015/0020119 | A1 | 1/2015 | Kim et al. | |
| 2015/0089403 | A1 | 3/2015 | Zhu et al. | |
| 2015/0119198 | A1* | 4/2015 | Wisbey | A61B 5/1118 |
| | | | | 482/9 |
| 2015/0268955 | A1 | 9/2015 | Mehalingam et al. | |
| 2015/0347394 | A1 | 12/2015 | Hirama et al. | |
| 2016/0098172 | A1 | 4/2016 | Bacinschi | |
| 2016/0117151 | A1 | 4/2016 | Birkenhauer | |
| 2016/0170714 | A1 | 6/2016 | Siu et al. | |
| 2016/0188183 | A1 | 6/2016 | Soffer | |
| 2016/0259491 | A1 | 9/2016 | Jacobs et al. | |
| 2016/0299884 | A1 | 10/2016 | Chioasca et al. | |
| 2016/0321307 | A1* | 11/2016 | Dingman | G06F 16/25 |
| 2016/0357526 | A1 | 12/2016 | Soffer et al. | |
| 2017/0109341 | A1 | 4/2017 | Issa | |
| 2017/0160891 | A1 | 6/2017 | Chefalas et al. | |
| 2017/0316707 | A1* | 11/2017 | Lawrenson | A61B 5/163 |
| 2017/0337045 | A1 | 11/2017 | Hills et al. | |
| 2017/0346702 | A1 | 11/2017 | Wasserman et al. | |
| 2018/0046609 | A1 | 2/2018 | Agarwal et al. | |
| 2019/0049942 | A1* | 2/2019 | Dusane | B60R 25/25 |
| 2019/0095050 | A1* | 3/2019 | Gruber | B60K 35/00 |
| 2020/0192470 | A1* | 6/2020 | Van Rotterdam | G06F 3/013 |
| 2020/0326669 | A1* | 10/2020 | Penna Santana | G06N 20/10 |
| 2020/0356252 | A1* | 11/2020 | Ko | G04G 9/0064 |
| 2021/0090335 | A1* | 3/2021 | Rakshit | G06F 3/04815 |

OTHER PUBLICATIONS

Office Action, dated Jun. 28, 2018, Regarding U.S. Appl. No. 15/233,497, 16 pages.

Office Action, dated Mar. 21, 2019, regarding U.S. Appl. No. 15/233,497, 18 pages.

Notice of Allowance, dated Aug. 21, 2019, regarding U.S. Appl. No. 15/233,497, 14 pages.

List of IBM Patents or Patent Applications listed as related, dated Dec. 2, 2019, 2 pages. (Appendix P).

"U.S. Appl. No. 15/233,497, Response filed Sep. 26, 2018 to Non Final Office Action dated Jun. 28, 2018", 34 pgs.

"U.S. Appl. No. 15/233,497, Response filed Apr. 17, 2019 to Non Final Office Action dated Mar. 21, 2019", 24 pgs.

U.S. Appl. No. 15/233,497, filed Aug. 10, 2016, Generating a User Interface Template by Combining Relevant Components of the Different User Interface Templates Based on the Action Request by the User and the User Context.

* cited by examiner

GENERATING TEMPLATES FOR
AUTOMATED USER INTERFACE
COMPONENTS AND VALIDATION RULES
BASED ON CONTEXT

BACKGROUND

1. Field

The disclosure relates generally to user interfaces and more specifically to generating or selecting a user interface template for display of user interface components or widgets within a user interface and selection of corresponding validation rules to the user interface components, with display of the user interface components within the user interface changing based on a real-time assessment of a user context, which may include a cognitive state of the user while performing a task on a data processing system platform, data processing system platform context, and the validation rules.

2. Description of the Related Art

A user interface (UI) is the space where interactions occur between a human user and a machine. These interactions allow effective operation and control of the machine from the user side, while the machine side feeds back information to the user, which may aid in the user's decision-making process. One goal of user interface design is to produce a user interface that makes the user interface user-friendly (e.g., self-explanatory) in operating the machine in a way that produces a desired result. Typically, the user interface includes a set of commands or menus through which the user communicates with a program of the machine. A graphical user interface (GUI) is a type of user interface that allows users to interact with machines, such as computers and mobile devices, through windows, graphical icons, and visual indicators. Actions in a GUI are generally performed through direct manipulation of the graphical components or widgets. To make design of user interfaces faster and more efficient, developers of user interfaces may generate and utilize user interface templates.

SUMMARY

According to one illustrative embodiment, a computer-implemented method for generating a user interface template is provided. A computer determines a user context corresponding to an action request by a user to perform a task on the computer. The computer retrieves a set of user interface templates corresponding to the action request by the user and the user context. The computer compares components of different user interface templates within the set of user interface templates. The computer combines relevant components of the different user interface templates based on the action request by the user and the user context. The computer generates the user interface template corresponding to the action request by the user and the user context based on the combined relevant components of the different user interface templates. According to other illustrative embodiments, a computer system and computer program product for generating a user interface template are provided.

DETAILED DESCRIPTION

Figure 1:
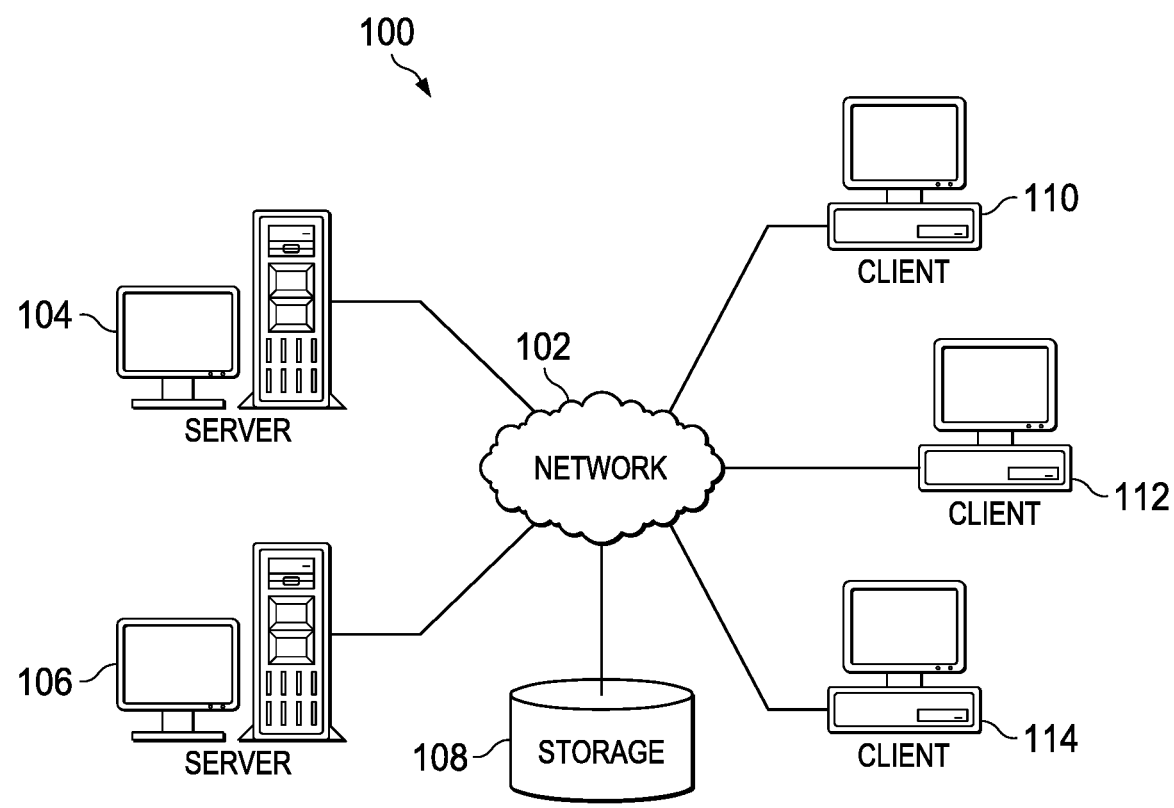
FIG. 1 is a pictorial representation of a network of data processing systems in which illustrative embodiments may be implemented.

The present invention may be a system, a method, and/or a computer program product. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
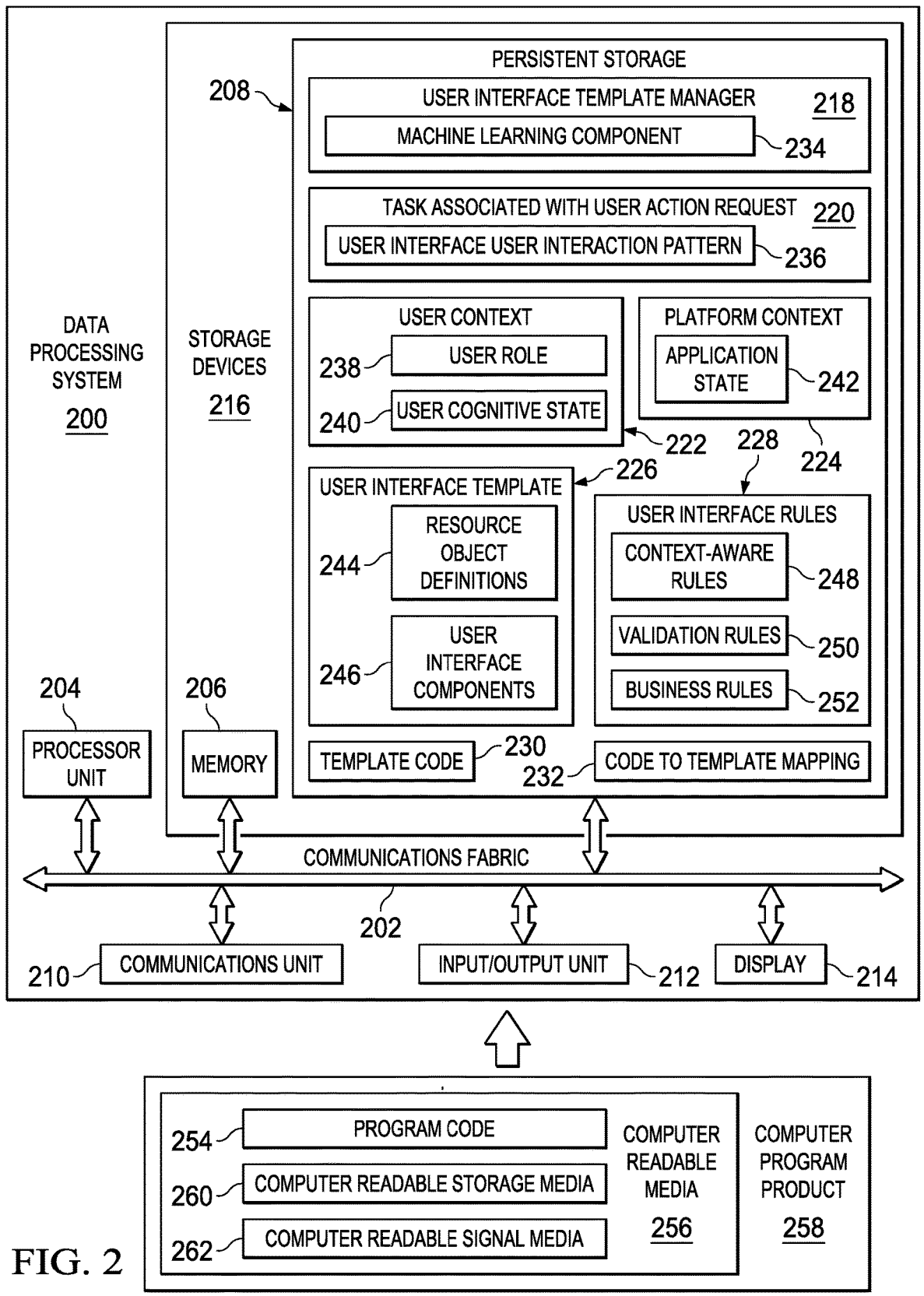
FIG. 2 is a diagram of a data processing system in which illustrative embodiments may be implemented.
Figure 3:
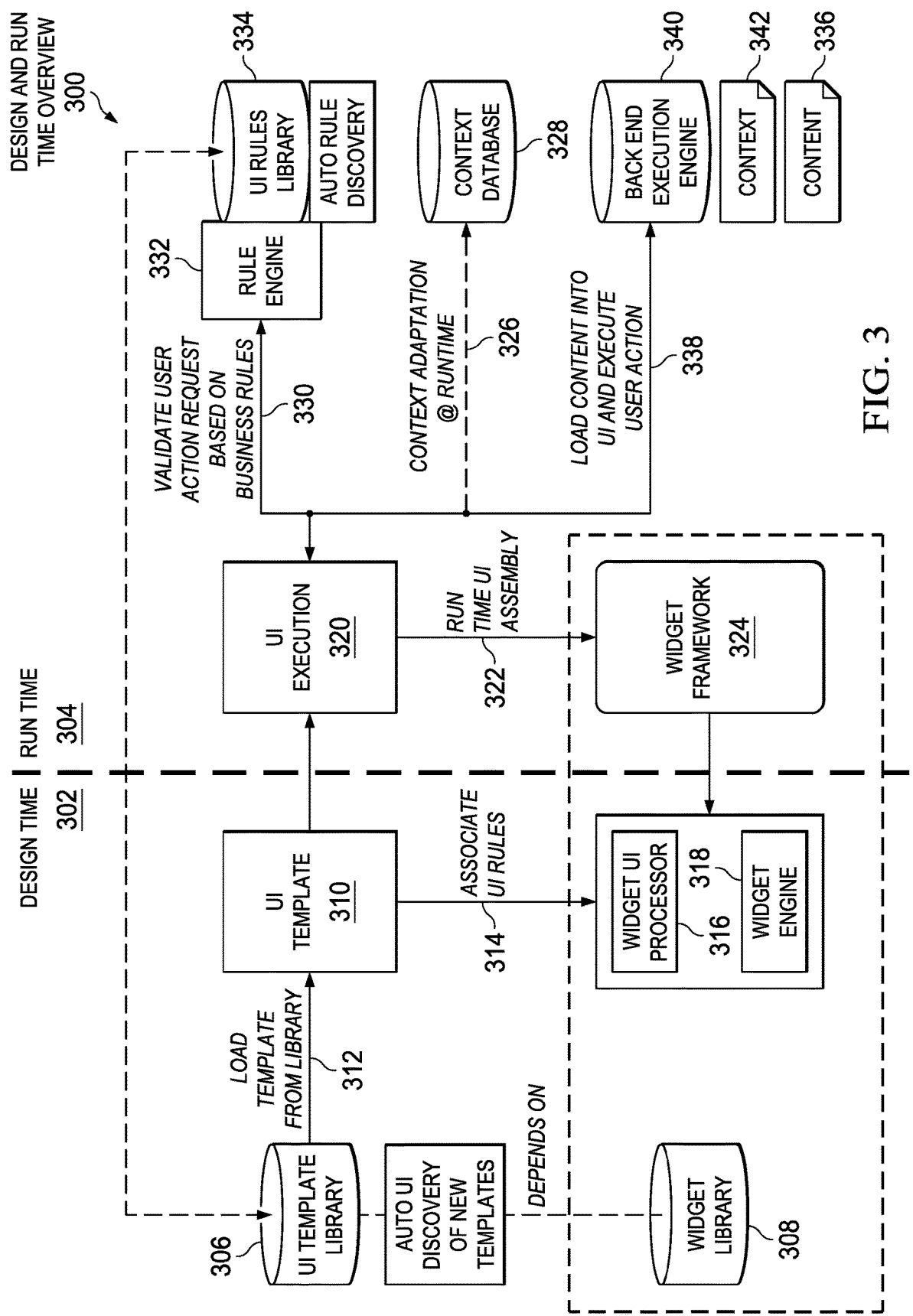
FIG. 3 is a diagram illustrating an example of a design and run time overview in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and the other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. In addition, server 104 may provide a set of one or more services to client devices of registered customers. The set of services may be any type of computer-related services, such as banking services, data storage services, and the like. Also, it should be noted that server 104 may represent a plurality of different servers providing a plurality of different services to registered customers.

Server 106 may generate a user interface template for display of user interface components within a user interface and select corresponding rules to the user interface components, with display of the user interface components within the user interface changing based on a real-time assessment of a cognitive state of a user that is performing a task on a data processing system platform, context of the data processing system platform, which may include application state, and the corresponding rules. For example, server 106 determines that a user performing a task on a critical application on a particular data processing system platform is distracted based on real-time assessment of the user's cognitive state and then generates a new user interface template that removes or disables one or more components of the user interface preventing the user from performing the task on the critical application based on corresponding user interface rules. Data processing system platforms that server 106 may be monitoring for the context of the user and/or the platform may be, for example, server 104, client 110, client 112, client 114, or any combination thereof. However, it should be noted that each of server 104, client 110, client 112, and client 114 may generate user interface templates based on user context, platform context, and corresponding user interface rules in addition to, or instead of, server 106. Furthermore, it should be noted that server 106 also may represent a plurality of different servers, which may be located locally to server 104, client 110, client 112, and client 114, or may be distributed remotely within network 102.

Client 110, client 112, and client 114 also connect to network 102. Clients 110, 112, and 114 are clients of server 104 and server 106. Users of clients 110, 112, and 114 may use clients 110, 112, and 114 to access the set of services provided by server 104, for example. Server 104 and server 106 also may provide information, such as boot files, operating system images, and software applications to clients 110, 112, and 114.

In this example, clients 110, 112, and 114 are illustrated as desktop computers, which may have wire or wireless communication links to network 102. However, it should be noted that clients 110, 112, and 114 are intended as examples only. In other words, clients 110, 112, and 114 also may include other devices, such as, for example, network computers, laptop computers, handheld computers, smart phones, smart watches, personal digital assistants, gaming devices, or any combination thereof.

Server 106 may collect a plurality of different types of data from server 104 and clients 110, 112, and 114 to generate the user interface templates. Moreover, server 106 may link each generated user interface template to a set of corresponding user interface rules, such as, for example, context-aware rules, validation rules, and/or business rules, and user interface template code.

Storage 108 is a network storage device capable of storing any type of data in a structured format or an unstructured format. In addition, storage 108 may represent a set of one or more network storage devices. Storage 108 may store, for example, names and identification numbers of a plurality of different users, user profiles, user interface templates, code corresponding to respective user interface templates, code to template mappings, user interaction patterns of user interface components for different user interface templates, user interface rules, and the like. A user profile may contain, for example, a role of a particular user, job title, job duties, resource access permissions, and the like. Further, storage 108 may store other data, such as authentication or credential data that may include user names, passwords, and biometric data associated with user interface developers, system administrators, and users, for example.

In addition, it should be noted that network data processing system 100 may include any number of additional server devices, client devices, and other devices not shown. Program code located in network data processing system 100 may be stored on a computer-readable storage medium and downloaded to a computer or other data processing device for use. For example, program code may be stored on a computer-readable storage medium on server 104 and downloaded to client device 110 over network 102 for use on client device 110.

In the depicted example, network data processing system 100 may be implemented as a number of different types of communication networks, such as, for example, an internet, an intranet, a local area network (LAN), and a wide area network (WAN). FIG. 1 is intended as an example, and not as an architectural limitation for the different illustrative embodiments.

With reference now to FIG. 2, a diagram of a data processing system is depicted in accordance with an illustrative embodiment. Data processing system 200 is an example of a platform computer, such as server 106 or client 110 in FIG. 1, in which computer-readable program code or program instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A computer-readable storage device is any piece of hardware that is capable of storing information, such as, for example, without limitation, data, computer-readable program code in functional form, and/or other suitable information either on a transient basis and/or a persistent basis. Further, a computer-readable storage device excludes a propagation medium. Memory 206, in these examples, may be, for example, a random access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores user interface template manager 218, task associated with user action request 220, user context 222, platform context 224, user interface template 226, user interface rules 228, template code 230, and code to template mapping 232. However, it should be noted that persistent storage 208 may store more or less information than illustrated depending on the different illustrative embodiments.

User interface template manager 218 monitors user context 222 and platform context 224, which correspond to task associated with user action request 220, to generate user interface template 226 for displaying user interface components 246 within a user interface and select rules within user interface rules 228 that correspond to user interface components 246, with display of user interface components 246 within the user interface changing based on real-time assessment of user context 222 and platform context 224 while the user performs task associated with user action request 220. It should be noted that even though user interface template manager 218 is illustrated as residing in persistent storage

208, in an alternative illustrative embodiment user interface template manager 218 may be a separate component of data processing system 200. For example, user interface template manager 218 may be a hardware component coupled to communication fabric 202 or a combination of hardware and software components.

Also in this example, user interface template manager 218 may include machine learning component 234. Machine learning component 234 may be, for example, an active learning process, such as a support vector machine (SVM)-based active learning algorithm. User interface template manager 218 may utilize machine learning component 234 to learn overtime how to improve selection or generation of user interface templates based on multi-label classification of user interface templates using data inputs, such as types of tasks associated with user action requests, customers, user contexts, platform contexts, and the like.

Task associated with user action request 220 represents some type of task that a user is requesting to perform on a data processing system platform, such as increase memory on the data processing system platform based on the platform's configuration. The data processing system platform may be, for example, data processing system 200, itself, or another data processing system platform, such as server 104 or client 110 in FIG. 1. In this example, task associated with user action request 220 includes user interface user interaction pattern 236. User interface user interaction pattern 236 represents a pattern of user interactions with components of a user interface corresponding to task associated with user action request 220.

User context 222 represents a context of the user of the data processing system platform. In this example, user context 222 includes user role 238 and user cognitive state 240. User role 238 represents the role of the user as it corresponds to task associated with user action request 220. User interface template manager 218 may determine user role 238 by, for example, retrieving data from a profile corresponding to the user. User cognitive state 240 represents the state of mind or mental alertness of the user requesting to perform the task on the data processing system platform. User interface template manager 218 may determine user cognitive state 240 by receiving biometric data corresponding to the user requesting to perform the task from a set of one or more biometric measuring devices communicatively coupled to the data processing system platform.

Platform context 224 represents the context of the data processing system platform, itself. In this example, platform context 224 includes application state 242. Application state 242 represents the current circumstances surrounding or the current status of a set of one or more applications running on the data processing system platform.

User interface template 226 represents the user interface template that user interface template manager 218 generates based on task associated with user action request 220, user context 222, platform context 224, and user interface rules 228. However, it should be noted that user interface template 226 may represent a plurality of different user interface templates. In this example, user interface template 226 includes resource object definitions 244 and user interface components 246. Resource object definitions 244 represent attributes or descriptions of a set of one or more resources on the data processing system platform that correspond to performing task associated with user action request 220. User interface components 246 represent a set of visible widgets in the user interface that interacts with a set of applications that controls the set of resources corresponding to resource object definitions 244.

User interface rules 228 represent a set of rules that user interface template manager utilizes while generating user interface template 226. In this example, user interface rules 228 include context-aware rules 248, validation rules 250, and business rules 252. Context-aware rules 248 represent a set of rules that permit or deny a user to perform a particular task on the data processing system platform based on the user's current role and/or context. For example, context-aware rules 248 may not permit a user to perform a particular task on the data processing system platform while user context 222 is below a defined user context threshold level (e.g., the user is distracted or inattentive). Validation rules 250 represent a set of rules that validate or invalidate entries made by a user into a user interface. For example, validation rules 250 may not permit a user to enter numeric characters in an alphabetic character entry box of a user interface. Business rules 252 represent a set of rules that permit or deny a user to perform a particular task on the data processing system platform based on current business practices of the enterprise owning the data processing system platform. For example, business rules 252 may only permit a user to perform a particular task on the data processing system platform between the hours of 9:00 a.m. and 5:00 p.m. (i.e., during business hours only).

User interface template manager 218 generates template code 230 that renders user interface components 246 and validates user interface user interaction pattern 236 based on user context 222, platform context 224, and user interface rules 228. Template code 230 may be a standard language, such as, for example, hypertext markup language (HTML), Java Script, or a Java Script variant. After generating template code 230, user interface template manager 218 generates code to template mapping 232, which associates template code 230 with user interface template 226.

Communications unit 210, in this example, provides for communication with other computers, data processing systems, and devices via a network, such as network 102 in FIG. 1. Communications unit 210 may provide communications using both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), bluetooth technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer implemented program instructions, which may be located in a memory, such as memory 206. These program instructions are referred to as program code, computer usable program code, or computer-readable program code that may be read and run by a processor in processor unit 204. The program code, in the different embodiments, may be embodied on different physical computer-readable storage devices, such as memory 206 or persistent storage 208.

Program code 254 is located in a functional form on computer-readable media 256 that is selectively removable and may be loaded onto or transferred to data processing system 200 for running by processor unit 204. Program code 254 and computer-readable media 256 form computer program product 258. In one example, computer-readable media 256 may be computer-readable storage media 260 or computer-readable signal media 262. Computer-readable storage media 260 may include, for example, an optical or magnetic disc that is inserted or placed into a drive or other device that is part of persistent storage 208 for transfer onto a storage device, such as a hard drive, that is part of persistent storage 208. Computer-readable storage media 260 also may take the form of a persistent storage, such as a hard drive, a thumb drive, or a flash memory that is connected to data processing system 200. In some instances, computer-readable storage media 260 may not be removable from data processing system 200.

Alternatively, program code 254 may be transferred to data processing system 200 using computer-readable signal media 262. Computer-readable signal media 262 may be, for example, a propagated data signal containing program code 254. For example, computer-readable signal media 262 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer-readable media also may take the form of non-tangible media, such as communication links or wireless transmissions containing the program code.

In some illustrative embodiments, program code 254 may be downloaded over a network to persistent storage 208 from another device or data processing system through computer-readable signal media 262 for use within data processing system 200. For instance, program code stored in a computer-readable storage media in a data processing system may be downloaded over a network from the data processing system to data processing system 200. The data processing system providing program code 254 may be a server computer, a client computer, or some other device capable of storing and transmitting program code 254.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer-readable storage device in data processing system 200 is any hardware apparatus that may store data. Memory 206, persistent storage 208, and computer-readable storage media 260 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Illustrative embodiments generate or select a user interface template for displaying user interface (UI) components within a user interface and select validation rules corresponding to the user interface components, with illustrative embodiments changing the user interface display based on a real-time assessment of the cognitive state of user that is performing a task on a data processing system platform. Illustrative embodiments may learn which user interface templates, or user interface template alterations, are suitable for different cohorts of users and business activities. Illustrative embodiments may base the different cohorts of users on, for example, different roles corresponding to respective users. Illustrative embodiments generate the code for rendering the user interface components and validating user interface user interaction patterns.

Illustrative embodiments were developed because typically it takes two to three weeks for template development, which includes policies, user interface, process model, and automation. Also, the addition of new assets is a manual process and time-consuming. In addition, the deployment of new user interface content needs to be improved. User interface templates of illustrative embodiments facilitate faster user interface development at design time and facilitate faster user interface adaptation at run time. Thus, illustrative embodiments increase time-to-value for user interface content development, validation, and deployment. Further, illustrative embodiments automate the user interface re-configuration process.

Illustrative embodiments provide for displaying user interface content with increased versatility. Traditionally, user interface components are associated with templates without any regard to the real-time cognitive state of the user and context of platform components.

Illustrative embodiments associate user interface templates with user interface components and user interface rules based on the current mood and current cognitive state of the user or users, along with a consideration of the content and the screen size to display the content, as well as the contextual state of the platform. The user interface template controls the layout and flow of user interface components and user interface rules corresponding to the user interface components and underlying associated resources.

Illustrative embodiments may be enhanced with template composition, where template "snippets" are composed in real time based on a user's and platform's real time context.

Additionally, illustrative embodiments include a learning component that refines user interface templates over time.

Illustrative embodiments generate two types of user interface templates. One type is a design user interface template and the other is an execution user interface template. Illustrative embodiments utilize the design user interface template to generate a base user interface framework. These design user interface templates enable automatic code generation. Illustrative embodiments utilize execution user interface templates for capturing behavior of users and platforms and for cognitive adaptation.

Design user interface templates may, for example, consist of specifications for: 1) page navigation; 2) page attributes; 3) resource object to attributes mapping; and 4) validation rule source and mapping. Design user interface templates are meant as a resource for automatic generation of user interfaces. These templates are dynamic in the sense that they automatically update the sources for resource objects and user interface rules, but are generic enough to generate user interfaces for different use cases.

User interface templates at design time enable user interface automation for identified user interface user interaction patterns by utilizing widget and user interface rules libraries that provide valid data types to write a user interface template. The user interface rules library may comprise different sets of rules, such as, for example, context-aware rule, validation rules, and business rules. A subject matter expert initially writes the user interface template and template code for an identified user interface component user interaction pattern. Illustrative embodiments utilize a rules library to template code repository mapping to associate user interface rules to template code. Each data type in the user interface library has a corresponding code block in the template code repository, which user interface developers can search.

Variables of an identified user interface component user interaction pattern may include: 1) resource objects and their corresponding attributes; and 2) user interface rules, which include business rules. Resource objects may include, for example, memory or portions of an operating system, such as a service or daemon of the operating system. Illustrative embodiments may address variability in resource objects with model-driven run time technology, which includes a framework for configuring user interface components or widgets by mapping resource objects to user interface components. Illustrative embodiments may address variability in user interface rules by selecting an appropriate rule from the user interface rules library, in which case, illustrative embodiments suggest modification to the template code. Illustrative embodiments modify inspection result processors or widget processors of the model-driven run time technology, if the user interface rules library does not support a rule. Illustrative embodiments may address variability in business rules by modifying the Java Script Object Notation file for business rules engines.

Illustrative embodiments utilize execution templates at run time for cognitive user scenarios. For example, illustrative embodiments record user interface component user interactions, such as, for example, user mouse clicks selections of user interface components. Illustrative embodiments utilize this recorded information of user interface user interactions to generate the user interface templates. After illustrative embodiments obtain a defined level of confidence in a user interface template through active learning, illustrative embodiments generate a ready to execute user interface template (i.e., an execution template) with an option to modify parameters of the user interface template.

For example, illustrative embodiments generate a user interface template for a user who modifies paging space differently from a user interface template for a user who reboots a server, which illustrative embodiments generate these different user interface templates based on user context.

When a user logs in, illustrative embodiments recommend a set of one or more user interface templates based on the user's previously recorded user interface component user interactions. In addition, illustrative embodiments may perform a risk assessment and prevent the user from selecting a server reboot action by removing or disabling the server reboot component of the user interface if illustrative embodiments detect that the user is stressed or not focused. Further, based on a history of changes to the server, active learning as to run time adaptations to the server, and execution user interface templates invoked by a user, illustrative embodiments suggest a set of user interface templates. Moreover, if critical applications are running on the server and the critical applications have stopped, the user interface rules to reboot the server may change (e.g., no approval stage is necessary to reboot the server). In addition, when a particular user action request cannot be fulfilled, illustrative embodiments may transform the goal of the user to something that is still catered to, but to a lesser degree.

With reference now to FIG. 3, a diagram illustrating an example of a design and run time overview is depicted in accordance with an illustrative embodiment. Design and run time overview 300 may be implemented in a network of data processing systems, such as network data processing system 100 in FIG. 1 or in a single data processing system platform, such as data processing system 200 in FIG. 2.

Design and run time overview 300 includes design time 302 and run time 304. Design time 302 is for the development and design of user interface templates. Run time 304 is for the execution of the user interface templates.

Design time 302 utilizes user interface template library 306 and widget library 308 to generate user interface template 310. User interface template 310 may be, for example, user interface template 226 in FIG. 2. User interface template library 306 contains a plurality of different user interface templates that developers have previously created and stored. Widget library 308 contains a plurality of different user interface widgets or components that may be included in a user interface template. Design time 302 loads user interface template 310 from user interface template 306 at 312. In addition, design time 302 associates a set of user interface rules, such as a set of user interface rules from user interface rules 228 in FIG. 2, to user interface template 310 at 314. Widget user interface processor 316 may validate user interface template 310 using validation rules, such as validation rules 250 in FIG. 2. Widget engine 318 may render widgets or components in user interface template 310.

User interface execution 320 represents user interface template 310 at run time 304. Run time user interface assembly occurs at 322 using widget framework 324. Also, context adaptation of the user interface at run time 304 occurs at 326 using information in context database 328. Further, run time 304 validates a user action request based on business rules at 330. Rule engine 332 retrieves the business rules from user interface rules library 334 and applies the business rules to validate the user action request. Run time 304 also loads content 336 into the user interface and executes the user action at 338 if no rules are violated using back end execution engine 340 based on context 342. Context 342 may be, for example, user context 222 and/or platform context 224 in FIG. 2.

Figure 4:
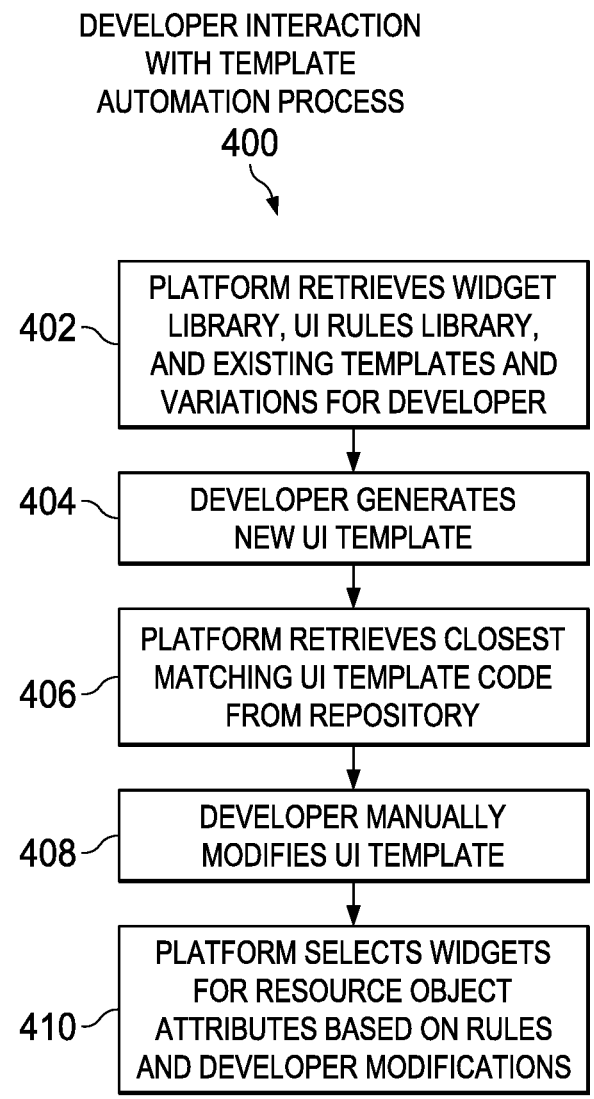
FIG. 4 is a diagram illustrating an example of developer interaction with a user interface template automation process in accordance with an illustrative embodiment.

With reference now to FIG. 4, a diagram illustrating an example of developer interaction with a user interface template automation process is depicted in accordance with an illustrative embodiment. Developer interaction with template automation process 400 may be implemented in a network of data processing systems, such as network data processing system 100 in FIG. 1 or in a data processing system platform, such as data processing system 200 in FIG. 2.

In this example, developer interaction with template automation process 400 includes steps 402, 404, 406, 408, and 410. However, it should be noted that different illustrative embodiments may include more or fewer steps than illustrated. At step 402, the platform retrieves a widget library, a user interface rules library, and existing templates and variations for a developer. The widget library, user interface rules library, and user interface template library may be, for example, widget library 308, user interface rules library 334, and user interface template library 306 in FIG. 3.

At step 404, the developer generates a new user interface template based on the information retrieved by the platform at step 402. The new interface template corresponds to a particular user interface component user interaction pattern associated with a user action request. The particular user interface component user interaction pattern may be, for example, user interface user interaction pattern 236 in FIG. 2.

In response to the developer generating the new user interface template at step 404, the platform retrieves closest matching user interface template code from a repository at step 406. The user interface template code may be, for example, template code 230 in FIG. 2. At step 408, the developer manually modifies the user interface template. The developer modifies the template code to address variations in resource object type and user interface rules and is aided by the platform's model-driven run time technology and rules library. Then at step 410, the platform selects widgets for resource object attributes based on the rules and developer modifications.

Service developers need not learn a new specification language. Illustrative embodiments utilize a standard language, such as HTML or a Java Script variant, for the user interface template code. In addition, the model-driven run time library may be in Java Script as well. An expectation is that user interface user interaction patterns will embed the required user interface rules. Hence, there is a minimal need for service developer to understand the model-driven run time technology. However, platform developers need to understand the model-driven run time technology because the platform developers need to incrementally support newer user interface user interaction patterns and user interface rules, for example.

Figure 5:
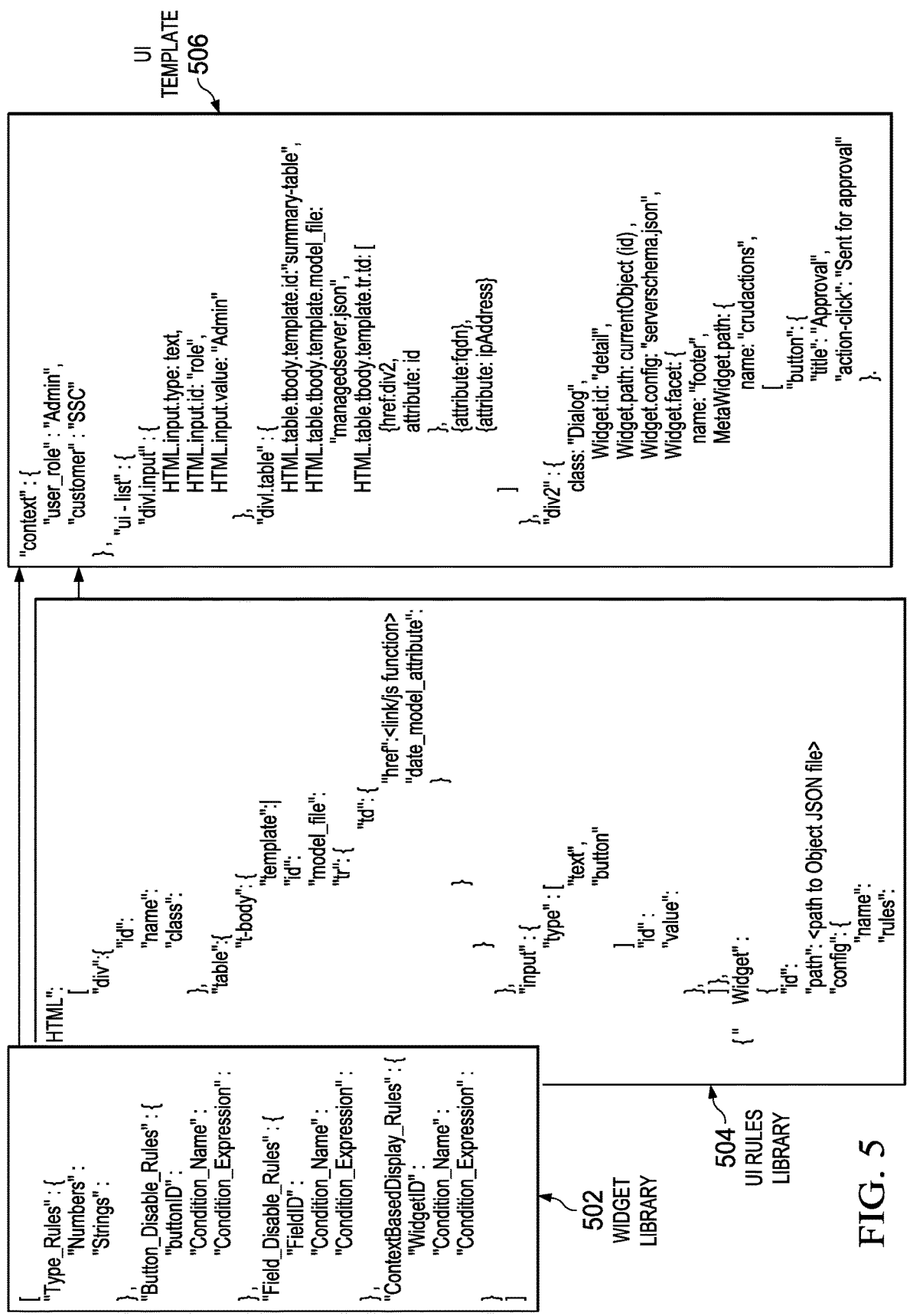
FIG. 5 is a diagram illustrating specific examples of a widget rule library, a user interface rule library, and a user interface template in accordance with an illustrative embodiment.

With reference now to FIG. 5, a diagram illustrating specific examples of a widget library, a user interface rule library, and a user interface template are depicted in accordance with an illustrative embodiment. Widget library 502 may be, for example, widget library 308 in FIG. 3. User interface rules library 504 may be, for example, user interface rules library 334 in FIG. 3. User interface template 506 may be, for example, user interface template 310 in FIG. 3.

Figure 6:
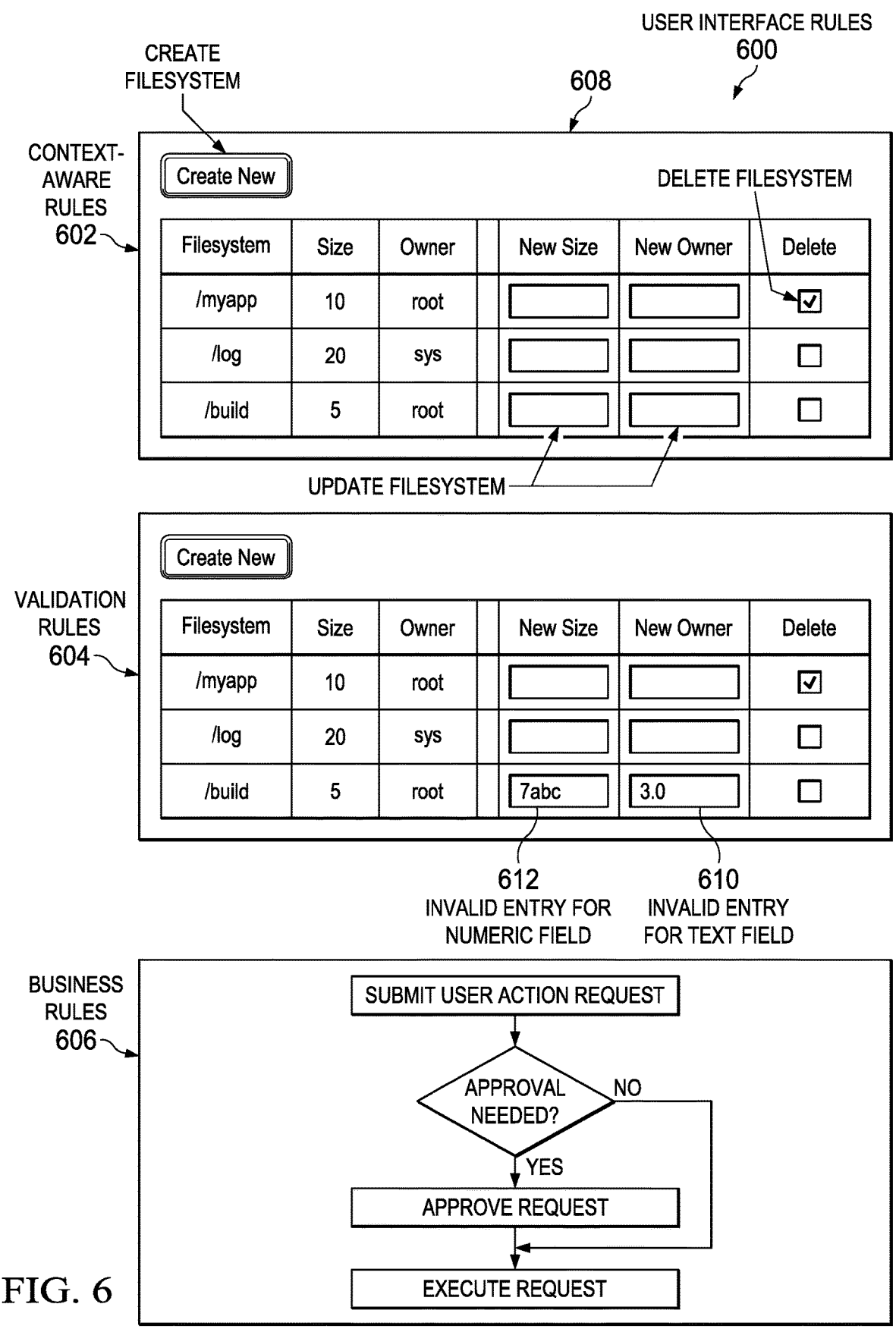
FIG. 6 is an example of user interface rules in accordance with an illustrative embodiment.

With reference now to FIG. 6, an example of user interface rules is depicted in accordance with an illustrative embodiment. User interface rules 600 may be, for example, user interface rules 228 in FIG. 2. In this example, user interface rules 600 include context-aware rules 602, validation rules 604, and business rules 606. Context-aware rules 602, validation rules 604, and business rules 606 may be, for example, context-aware rules 248, validation rules 250, and business rules 252 in FIG. 2.

Context-aware rules 248 are authorization user interface rules that provide a role-based resource object and attribute display. For example, customer Y is authorized to submit requests for additional storage. The user interface display is determined by create, read, update, and delete (CRUD) permissions associated with the resource object and corresponding attributes for each user role.

In this example, user interface display 608 illustrates a user interface display for a user with role X. The user role may be, for example, user role 238 in FIG. 2. User interface display 608 also illustrates components or widgets for create a new file system and delete a file system. Further, user interface display 608 illustrates file system name with corresponding size and owner attributes. Furthermore, user interface display 608 illustrates field components to enter new size and owner values for each particular file system. The field component for entering a new file system size may be, for example, a numeric value entry field. The field component for entering a new file system name may be, for example, an alphabetic value entry field.

Validation rules 604 perform data type checking. For example, validation rules 604 should not allow alphabetic string values for integer data type attributes. Validation rules 604 also may provide range constraints for data inputs, required attribute values, attribute dependencies on other attributes, and validation of user actions depending on, for example, a current state of a set of applications in the platform. For example, stopping a service is possible when the service is currently running. In this example, validation rules 604 invalidate new file system owner value 610 because new file system owner value 610 contains numeric values in the alphabetic value field component. Also in this example, validation rules 604 invalidate new file system size value 612 because new file system size value 612 contains alphabetic values in the numeric value field component.

Developers write validation rules 604 in terse English or hide validation rules 604 in the template code. Sources of validation rules 604 may be, for example, existing template code databases, readme files, and external documents. Illustrative embodiments map validation rules 604 to the context and, accordingly, invoke the template code. Examples of natural language text rules are: 1) frequency with which to run a task corresponding to a user action request (default is hourly, but other valid values may include: daily, weekly, monthly, once, on log in, on start, or on idle) (it should be noted that a frequency of once requires a start time)); 2) start day specifies the first date on which the task is run (an optional string may be MM/DD/YYYY); 3) idle time for an on idle frequency where the time may be in minutes without user activity that must pass to trigger the task (e.g., 1-999 minutes); and 4) months of the year on which the task is run (e.g., JAN, FEB, MAR, APR, MAY, JUN, JUL, AUG, SEP, OCT, NOV, DEC, *) (it should be noted that multiple months are comma delimited).

Illustrative embodiments extract rule types from natural language documents or specifications. Illustrative embodiments match names of resource object attributes with allowable values of the attributes. For each sentence in a natural language document, illustrative embodiments extract rule keywords like optional, required, date or timestamp formats, and data type names, such as string, integer, et cetera. Illustrative embodiments determine whether resource object attributes are of an enumerated data type. If yes, then illustrative embodiments determine the allowable values for the attributes. In addition, illustrative embodiments find range expressions, such as, for example, 1-999, for the allowable values. Further, illustrative embodiments find dependencies between attributes by finding validation rules that state other attribute names, such as, for example, frequency and start time when the frequency value is "once". An example of a dependency between attribute types may be that if attribute "1" is specified, then attribute "2" is mandatory to be specified. The value of attribute "2" is governed by value of attribute "1". Illustrative embodiments tag each validation rule with the type of rule that it denotes. Each validation rule may have multiple tags.

Each rule type has a corresponding user interface template and illustrative embodiments map extracted validation rules from the natural language documents to an appropriate user interface template and use the attribute values of a resource object to instantiate the user interface template. For example, a rule type of "bounds" may have a corresponding user interface template of "Attr_name [<,>,<=,>=,=] value". A rule type of "mandatory" may have a corresponding user interface template of "Field Attr_name [*]". A rule type of "range" may have a corresponding user interface template of "Attr_name [[n1:n2], (n1:n2),[n1:n2),(n1:n2]]". A rule type of "dependency type 1 (value of attribute '1' governs attribute '2')" may have a corresponding user interface template of "Attr1[value]→Attr2". A rule type of "dependency type 2 (value of both of attribute "1" and attribute "2" have to be specified when either is specified)" may have a corresponding user interface template of "Attr1 & Attr 2".

Business rules 606 determine process flow based on CRUD actions and attribute values. For example, a cost of an action that is greater than 20 requires approval prior to execution. In addition, business rules 606 may determine permissible times for a requested user action.

In this example, business rules 606 determine whether approval is needed for a submitted user action request. If business rules 606 do not require approval prior to execution, then illustrative embodiments execute the user action request without prior approval. If business rules 606 require approval prior to execution, then illustrative embodiments wait for the approval prior to execution of the user action request.

Figure 7:
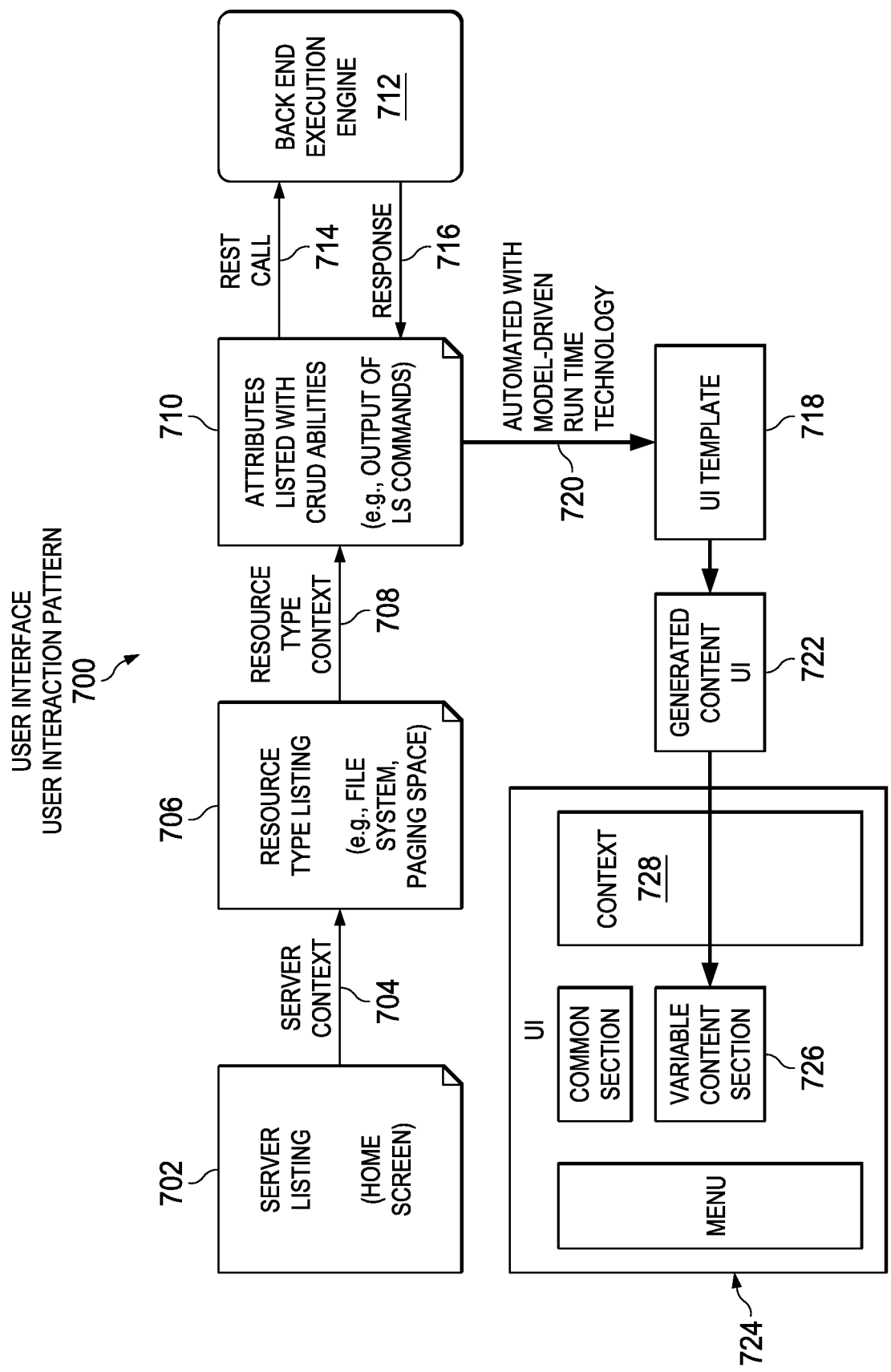
FIG. 7 is a diagram illustrating a specific example of a user interface user interaction pattern in accordance with an illustrative embodiment.

With reference now to FIG. 7, a diagram illustrating a specific example of a user interface user interaction pattern is depicted in accordance with an illustrative embodiment. User interface user interaction pattern 700 may be implemented in a network of data processing systems, such as network data processing system 100 in FIG. 1 or in a data processing system platform, such as data processing system 200 in FIG. 2. User interface user interaction pattern 700 may be, for example, user interface user interaction pattern 236 in FIG. 2.

In this example, illustrative embodiments present a server listing on a home screen at 702. Then at 704, illustrative embodiments determine the server context (i.e., platform context, such as platform context 224 in FIG. 2). Illustrative embodiments list resource object types, such as file system, paging space, and the like, at 706. Further, illustrative embodiments determine resource object type context at 708. Afterward, illustrative embodiments at 710 list attributes of the resource objects with CRUD abilities, such as, for example, output of "ls" operating system commands. Illustrative embodiments make a representational state transfer (REST) call to back end execution engine 712 at 714. Back end execution engine 712 may be, for example, back end execution engine 340 in FIG. 2. In response to the REST call, back end execution engine 712 provides a response at 716. Illustrative embodiments automatically generate user interface template 718 using model-driven run time technology at 720. User interface template 718 may be, for example, user interface template 310 in FIG. 3.

At 722, illustrative embodiments generate the content of the user interface. The content may be, for example, content 336 in FIG. 3. Moreover, illustrative embodiments generate user interface 724 with variable content section 726 based on context 728.

Figure 8:
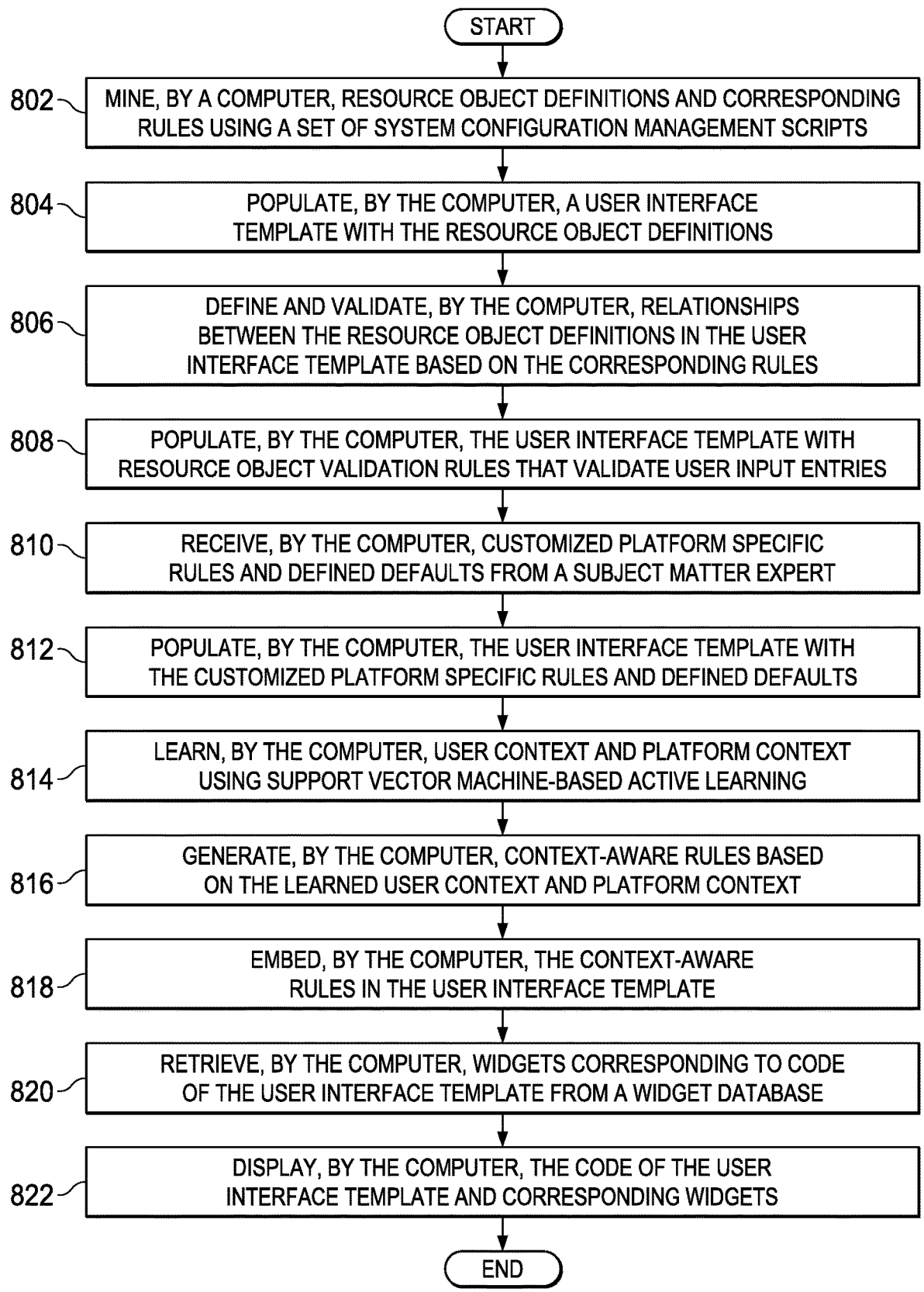
FIG. 8 is a flowchart illustrating a process for populating a user interface template in accordance with an illustrative embodiment.

With reference now to FIG. 8, a flowchart illustrating a process for populating a user interface template is shown in accordance with an illustrative embodiment. The process shown in FIG. 8 may be implemented in a computer, such as, for example, server 106 or client 110 in FIG. 1 and data processing system 200 in FIG. 2.

The process begins when the computer mines resource object definitions and corresponding rules using a set of system configuration management scripts (step 802). The resource object definitions and corresponding rules may be, for example, resource object definitions 244 and user interface rules 228 in FIG. 2. In addition, the computer populates a user interface template with the resource object definitions (step 804). The user interface template may be, for example, user interface template 310 in FIG. 3.

The computer also defines and validates relationships between the resource object definitions in the user interface template based on the corresponding rules (step 806). Further, the computer populates the user interface template with resource object validation rules that validate user input entries (step 808). The resource object validation rules may be, for example, validation rules 604 in FIG. 6.

Furthermore, the computer receives customized platform specific rules and defined defaults from a subject matter expert (step 810). Then, the computer populates the user interface template with the customized platform specific rules and defined defaults (step 812). The computer also learns user context and platform context using support vector machine-based active learning (step 814). The user context and platform context may be, for example, user context 222 and platform context 224 in FIG. 2. In addition, the computer generates context-aware rules based on the learned user context and platform context (step 816). The context-aware rules may be, for example, context-aware rules 602 in FIG. 6.

Subsequently, the computer embeds the context-aware rules in the user interface template (step 818). Moreover, the computer retrieves widgets corresponding to code of the user interface template from a widget database (step 820). The widgets may be, for example, user interface components 246 in FIG. 2. Afterward, the computer displays the code of the user interface template and corresponding widgets (step 822). The computer may display the user interface template code and corresponding widgets in a display device, such as display 214 in FIG. 2. Thereafter, the process terminates.

Figure 9:
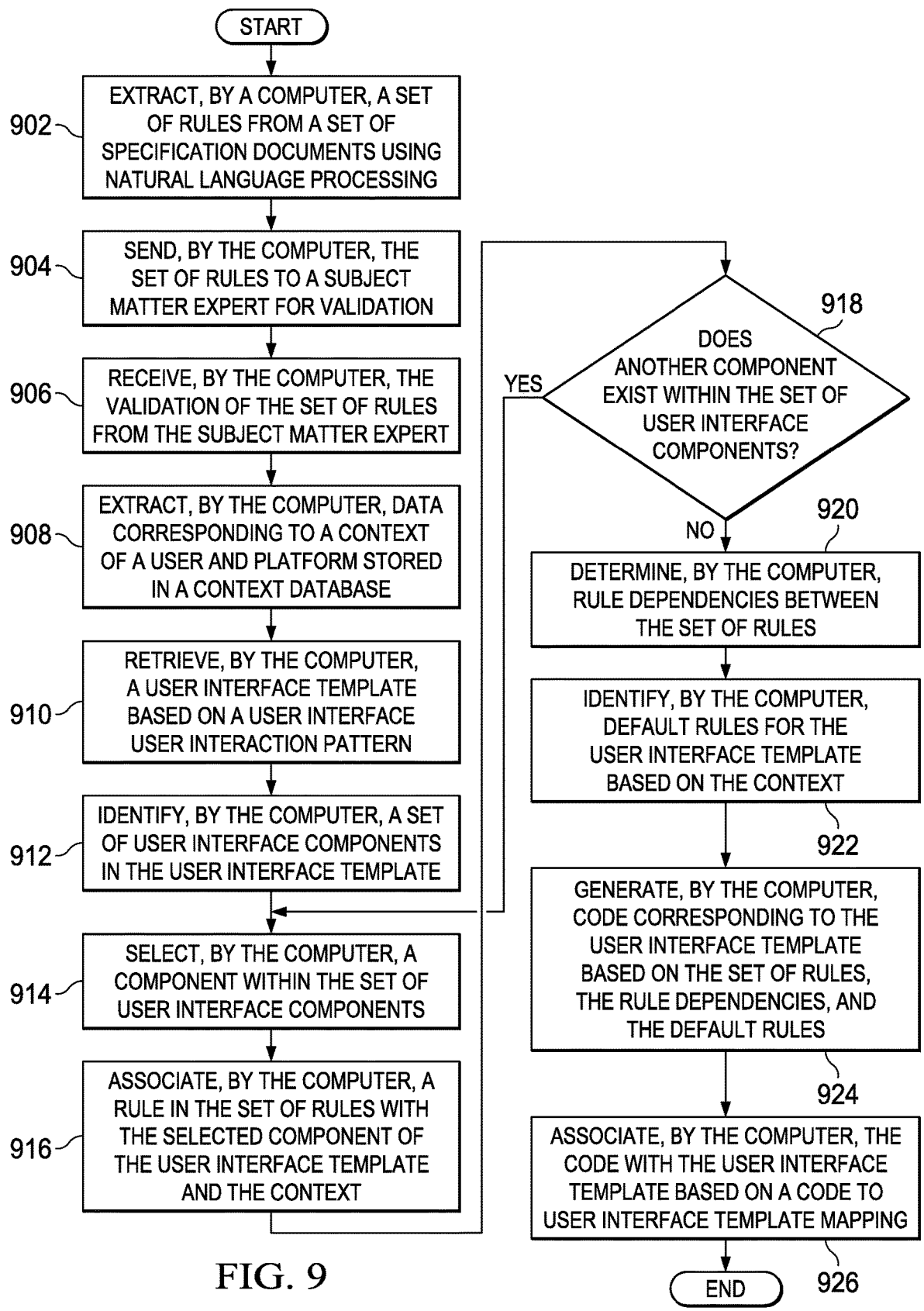
FIG. 9 is a flowchart illustrating a process for generating code for a user interface based on rules and rule dependencies in accordance with an illustrative embodiment.

With reference now to FIG. 9, a flowchart illustrating a process for generating code for a user interface based on rules and rule dependencies is shown in accordance with an illustrative embodiment. The process shown in FIG. 9 may be implemented in a computer, such as, for example, server 106 or client 110 in FIG. 1 and data processing system 200 in FIG. 2.

The process begins when the computer extracts a set of rules from a set of specification documents using natural language processing (step 902). The set of rules may be, for example, user interface rules 600 in FIG. 6. The computer sends the set of rules to a subject matter expert for validation (step 904). Subsequently, the computer receives the validation of the set of rules from the subject matter expert (step 906).

In addition, the computer extracts data corresponding to a context of a user and platform stored in a context database (step 908). The context database may be, for example, context database 328 in FIG. 3. The computer also retrieves a user interface template based on a user interface user interaction pattern (step 910). The user interface template may be, for example, user interface template 226 in FIG. 2. Further, the computer identifies a set of user interface components in the user interface template (step 912). The set of user interface components may be, for example, user interface components 246 in FIG. 2.

Afterward, the computer selects a component within the set of user interface components (step 914). The computer associates a rule in the set of rules with the selected component of the user interface template and the context (step 916). Then the computer makes a determination as to whether another component exists within the set of user interface components (step 918).

If the computer determines that another component does exist within the set of user interface components, yes output of step 918, then the process returns to step 914 where the computer selects another user interface component. If the computer determines that another component does not exist within the set of user interface components, no output of step 918, then the computer determines rule dependencies between the set of rules (step 920).

Further, the computer identifies default rules for the user interface template based on the context (step 922). Afterward, the computer generates code corresponding to the user interface template based on the set of rules, the rule dependencies, and the default rules (step 924). The code corresponding to the user interface template may be, for example, template code 230 in FIG. 2. In addition, the computer associates the code with the user interface template based on a code to user interface template mapping (step 926). The code to user interface template mapping may be, for example, code to template mapping 232 in FIG. 2. Thereafter, the process terminates.

Figure 10:
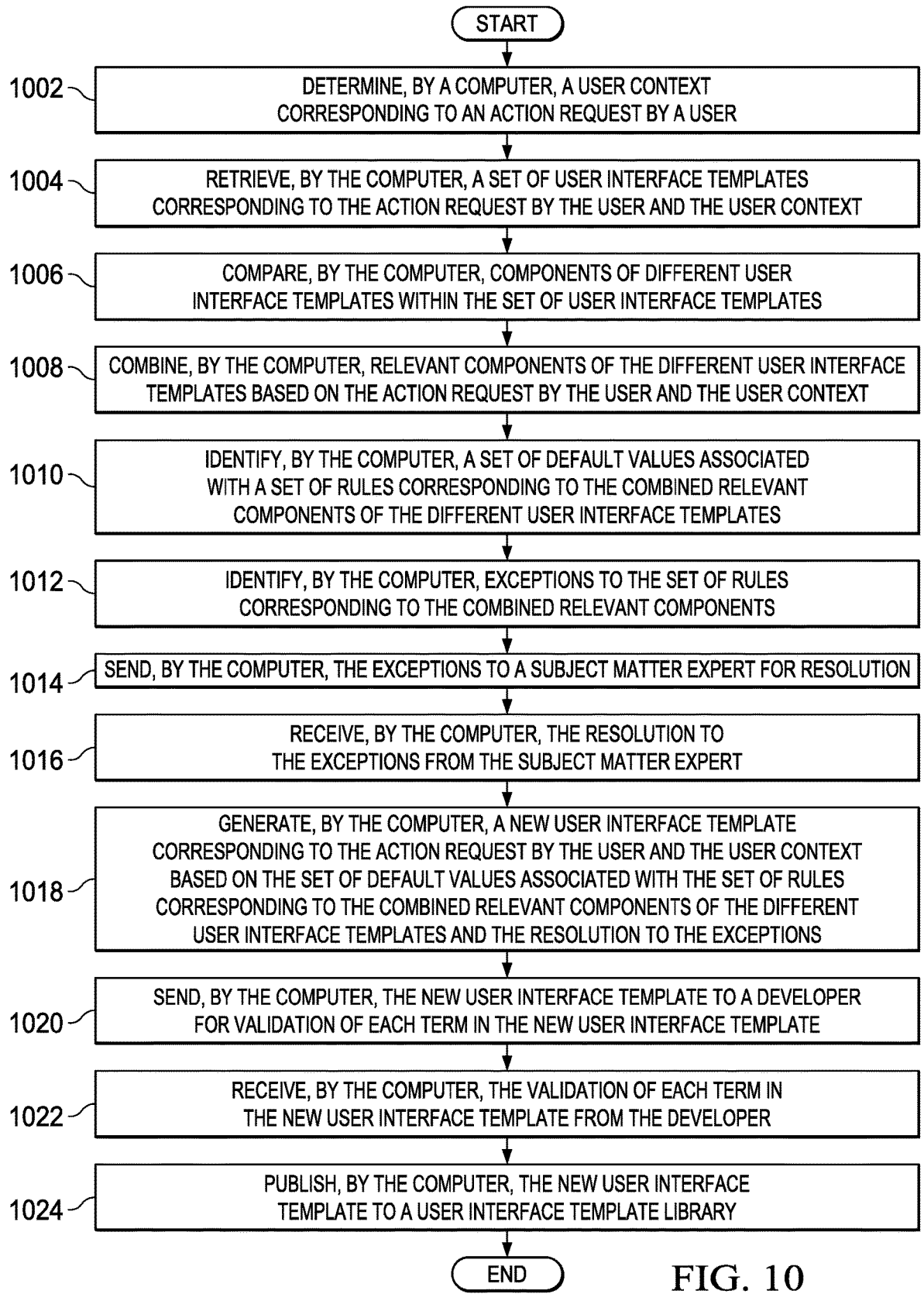
FIG. 10 is a flowchart illustrating a process for generating a user interface template based on user context in accordance with an illustrative embodiment.

With reference now to FIG. 10, a flowchart illustrating a process for generating a user interface template based on user context is shown in accordance with an illustrative embodiment. The process shown in FIG. 10 may be implemented in a computer, such as, for example, server 106 in FIG. 1 and data processing system 200 in FIG. 2.

The process begins when the computer determines a user context corresponding to an action request by a user (step 1002). The user context may be, for example, user context 222 in FIG. 2. In addition, the computer retrieves a set of user interface templates corresponding to the action request by the user and the user context (step 1004). The computer may retrieve the set of one or more user interface templates from a user interface template library, such as user interface library 306 in FIG. 3.

Further, the computer compares components of different user interface templates within the set of user interface templates (step 1006). Furthermore, the computer combines relevant components of the different user interface templates based on the action request by the user and the user context (step 1008). Moreover, the computer identifies a set of default values associated with a set of rules corresponding to the combined relevant components of the different user interface templates (step 1010).

The computer also identifies exceptions to the set of rules corresponding to the combined relevant components (step 1012). Then, the computer sends the exceptions to a subject matter expert for resolution (step 1014). Subsequently, the computer receives the resolution to the exceptions from the subject matter expert (step 1016).

Afterward, the computer generates a new user interface template corresponding to the action request by the user and the user context based on the set of default values associated with the set of rules corresponding to the combined relevant components of the different user interface templates and the resolution to the exceptions (step 1018). The computer sends the new user interface template to a developer for validation of each term in the new user interface template (step 1020). Subsequently, the computer receives the validation of each term in the new user interface template from the developer (step 1022). Then, the computer publishes the new user interface template to a user interface template library (step 1024). Thereafter, the process terminates.

Thus, illustrative embodiments of the present invention provide a computer-implemented method, computer system, and computer program product for automatically generating a user interface template for display of user interface components within a user interface and selection of corresponding validation rules to the user interface components, with the display of the user interface components within the user interface changing based on a real-time assessment of a cognitive state of the user while performing a task on a data processing system platform, context of the data processing system platform, and the validation rules. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for dynamically modifying a user interface based on monitored user context, the computer-implemented method comprising:
   determining that a user logs into a server;
   in response to determining that the user logs into the server, receiving, by a computer comprising the server, an action request to perform a task in relation to an application;
   determining, by the computer, a user context indicating a cognitive state of a user that initiated the action request;
   retrieving, by the computer, a set of user interface templates corresponding to the action request by the user and the user context;
   determining that the user context indicates that the user is stressed;
   removing a server reboot component from at least one of the user interface templates to prevent the user from selecting a server reboot action in response to determining that the user logs into the server and that the user context indicates that the user is stressed;
   comparing, by the computer, components of different user interface templates within the set of user interface templates, yielding a comparison;
   combining, by the computer, relevant components of the different user interface templates based on the comparison, the action request by the user and the user context, yielding combined relevant components;
   generating, by the computer, the user interface based on the combined relevant components of the different user interface templates, the user interface enabling the user to perform a first set of tasks in relation to the application;
   after causing presentation of the user interface on a device of the user, determining an updated user context of the user;
   determining an updated cognitive state and a mood of the user based on the updated user context;
   determining that the user is distracted based on the updated user context of the user; and
   in response to determining that the user is distracted and based on determining the updated cognitive state and the mood of the user, modifying the user interface to restrict the user from performing at least a first task while the user is distracted, wherein the modifying the user interface comprises:
   removing at least one component, yielding a modified user interface, the at least one component enabling the user to perform the first task, the modified user interface restricting the user to perform a second set of tasks in relation to the application, the second set of tasks being a subset of the first set of tasks.

2. The computer-implemented method of claim 1, further comprising:
   sending, by the computer, user interface templates to a developer for validation of each term in the user interface templates; and
   receiving, by the computer, the validation of each term in the user interface templates from the developer.

3. The computer-implemented method of claim 1, further comprising:
   extracting, by the computer, a set of rules from a set of specification documents using natural language processing;
   sending, by the computer, the set of rules to a subject matter expert for validation; and
   receiving, by the computer, the validation of the set of rules from the subject matter expert.

4. The computer-implemented method of claim 1, further comprising:
   extracting, by the computer, data corresponding to a context of the user from a context database; and
   retrieving, by the computer, the set of user interface templates based on a user interface user interaction pattern.

5. The computer-implemented method of claim 1, further comprising:
   identifying, by the computer, a set of user interface components in a user interface template;
   selecting, by the computer, each component within the set of user interface components; and
   associating, by the computer, a rule in a set of rules with each selected component of the user interface template and the user context.

6. The computer-implemented method of claim 1, further comprising:
   determining, by the computer, rule dependencies between a set of rules;
   identifying, by the computer, default rules for a user interface template based on the user context;
   generating, by the computer, code corresponding to the user interface template based on the set of rules, the rule dependencies, and the default rules; and
   associating, by the computer, the code with the user interface template based on a code to user interface template mapping.

7. The computer-implemented method of claim 1, further comprising:
   mining, by the computer, resource object definitions and corresponding rules using a set of system configuration management scripts; and
   populating, by the computer, a user interface template with the resource object definitions.

8. The computer-implemented method of claim 7, further comprising:
   defining and validating, by the computer, relationships between the resource object definitions in the user interface template based on the corresponding rules; and
   populating, by the computer, the user interface template with resource object validation rules that validate user input entries.

9. The computer-implemented method of claim 1, further comprising:
   receiving, by the computer, customized platform specific rules and defined defaults from a subject matter expert; and
   populating, by the computer, a user interface template with the customized platform specific rules and defined defaults.

10. The computer-implemented method of claim 1, further comprising:
    learning, by the computer, the user context and a platform context using support vector machine-based active learning;
    generating, by the computer, context-aware rules based on the learned user context and platform context; and
    embedding, by the computer, the context-aware rules in a user interface template.

11. The computer-implemented method of claim 1, further comprising:
  retrieving, by the computer, components corresponding to code of a user interface template from a widget database; and
  displaying, by the computer, the code of the user interface template and corresponding components.

12. A system comprising:
  one or more computer processors; and
  one or more computer-readable mediums storing instructions that, when executed by the one or more computer processors, cause the system to performing operations for dynamically modifying a user interface based on monitored user context, the operations comprising:
  determining that a user logs into a server;
  in response to determining that the user logs into the server, receiving by the server an action request to perform a task in relation to an application;
  determining a user context indicating a cognitive state of a user that initiated the action request;
  retrieving a set of user interface templates corresponding to the action request by the user and the user context;
  determining that the user context indicates that the user is stressed;
  removing a server reboot component from at least one of the user interface templates to prevent the user from selecting a server reboot action in response to determining that the user logs into the server and that the user context indicates that the user is stressed;
  comparing components of different user interface templates within the set of user interface templates, yielding a comparison;
  combining relevant components of the different user interface templates based on the comparison, the action request by the user and the user context, yielding combined relevant components;
  generating the user interface based on the combined relevant components of the different user interface templates, the user interface enabling the user to perform a first set of tasks in relation to the application;
  after causing presentation of the user interface on a device of the user, determining an updated user context of the user;
  determining an updated cognitive state and a mood of the user based on the updated user context;
  determining that the user is distracted based on the updated user context of the user; and
  in response to determining that the user is distracted and based on determining the updated cognitive state and the mood of the user, modifying the user interface to restrict the user from performing at least a first task while the user is distracted, wherein the modifying the user interface comprises:
  removing at least one component, yielding a modified user interface, the at least one component enabling the user to perform the first task, the modified user interface restricting the user to perform a second set of tasks in relation to the application, the second set of tasks being a subset of the first set of tasks.

13. The system of claim 12, the operations further comprising:
  sending user interface templates to a developer for validation of each term in the user interface templates; and
  receiving the validation of each term in the user interface templates from the developer.

14. The system of claim 12, the operations further comprising:
  extracting a set of rules from a set of specification documents using natural language processing;
  sending the set of rules to a subject matter expert for validation; and
  receiving the validation of the set of rules from the subject matter expert.

15. The system of claim 12, the operations further comprising:
  extracting data corresponding to a context of the user from a context database; and
  retrieving the set of user interface templates based on a user interface user interaction pattern.

16. The system of claim 12, the operations further comprising:
  identifying a set of user interface components in a user interface template;
  selecting each component within the set of user interface components; and
  associating a rule in a set of rules with each selected component of the user interface template and the user context.

17. The system of claim 12, the operations further comprising:
  determining rule dependencies between a set of rules;
  identifying default rules for a user interface template based on the user context;
  generating code corresponding to the user interface template based on the set of rules, the rule dependencies, and the default rules; and
  associating, by the computer, the code with the user interface template based on a code to user interface template mapping.

18. A non-transitory computer-readable medium storing instructions that, when executed by one or more computer processors of one or more computing devices, cause the one or more computing devices to performing operations for dynamically modifying a user interface based on monitored user context, the operations comprising:
  determining that a user logs into a server;
  in response to determining that the user logs into the server, receiving by the server an action request to perform a task in relation to an application;
  determining a user context indicating a cognitive state of a user that initiated the action request;
  retrieving a set of user interface templates corresponding to the action request by the user and the user context;
  determining that the user context indicates that the user is stressed;
  removing a server reboot component from at least one of the user interface templates to prevent the user from selecting a server reboot action in response to determining that the user logs into the server and that the user context indicates that the user is stressed;
  comparing components of different user interface templates within the set of user interface templates, yielding a comparison;
  combining relevant components of the different user interface templates based on the comparison, the action request by the user and the user context, yielding combined relevant components;
  generating the user interface based on the combined relevant components of the different user interface templates, the user interface enabling the user to perform a first set of tasks in relation to the application;

after causing presentation of the user interface on a device of the user, determining an updated user context of the user;

determining an updated cognitive state and a mood of the user based on the updated user context;

determining that the user is distracted based on the updated user context of the user; and in response to determining that the user is distracted and based on determining the updated cognitive state and the mood of the user, modifying the user interface to restrict the user from performing at least a first task while the user is distracted, wherein the modifying the user interface comprises:

removing at least one component, yielding a modified user interface, the at least one component enabling the user to perform the first task, the modified user interface restricting the user to perform a second set of tasks in relation to the application, the second set of tasks being a subset of the first set of tasks.

* * * * *